United States Patent Office 3,299,070
Patented Jan. 17, 1967

3,299,070
PIPERAZINE AMIDES OF 3-PHENYLCINNOLINE-
4-CARBOXYLIC ACIDS
Harman S. Lowrie, Glenview, Ill., assignor to G. D. Searle
& Co., Chicago, Ill., a corporation of Delaware
No Drawing. Filed May 6, 1965, Ser. No. 453,823
4 Claims. (Cl. 260—268)

The present invention relates to amides of 3-phenyl-cinnoline-4-carboxylic acids and piperazines. In particular, it relates to a group of compounds having the following general formula

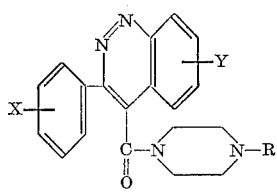

wherein X and Y are selected from the group consisting of hydrogen, methyl, methoxy, and halogen; and R is selected from the group consisting of hydrogen, lower alkyl, and hydroxy(lower alkyl). The halogens referred to above include fluorine, chlorine, bromine, and iodine. The lower alkyl radicals referred to above contain up to 6 carbon atoms and can be exemplified by methyl, ethyl, propyl, butyl, and the like. Examples of hydroxy(lower alkyl) are then hydroxyethyl, and hydroxypropyl.

In addition to the compounds described above, it is also possible to obtain amides wherein R in the formula above is amino, and acyl derivatives of such amino-piperazines. Where acyl is acetyl, the compound is an N-acetamidopiperazine.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are prepared by the reaction of an appropriate substituted piperazine with the acid halide of an appropriate 3-phenylcinnoline-4-carboxylic acid. The acid chloride is preferred and it is conveniently prepared from the carboxylic acid by reaction with thionyl chloride.

The compounds of the present invention are useful because of their pharmacological properties. In particular, they are anti-ulcer agents as demonstrated by their inhibition of ulceration in the Shay rat; the compounds are also useful as pepsin inhibitors. However, the present compounds do not produce a significant effect on blood pressure. In addition, the compounds possess anti-protozoal activity against the organism *Tetrahymena gelleii*. When R in the formula above is amino, the compounds possess central nervous system activity.

The following examples are presented to further illustrate the present invention; they should not be construed as limiting it in spirit or in scope. In these examples, quantities are indicated in parts by weight and temperatures in degrees centigrade (° C.).

Example 1

A solution of 5.4 parts of 3-phenylcinnoline-4-carbonyl chloride in 65 parts of methylene chloride is added portionwise to a mixture of 3 parts of pyridine and 3 parts of 1-methylpiperazine in 200 parts of methylene chloride. The resultant solution warms slightly during the mixing and it is allowed to stand for 16 hours. The solution is then washed with dilute potassium carbonate solution and dried, first by shaking with a saturated aqueous solution of sodium chloride and then by filtering through anhydrous potassium carbonate. The solvent is evaporated from the resultant solution under reduced pressure and the residue is disolved in dilute hydrochloric acid. The acid solution is washed with water and then made alkaline and the alkaline mixture is extracted with methylene chloride. The methylene chloride solution is dried by shaking with saturated aqueous sodium chloride solution and then filtering through anhydrous potassium carbonate. The dried solution is concentrated and then diluted with hexane and finally cooled. Yellow plates precipitate and these are separated. The product thus obtained is 1-methyl-4-(3-phenylcinnoline-4-carbonyl)-piperazine metling at about 184–185° C. This compound has the following formula

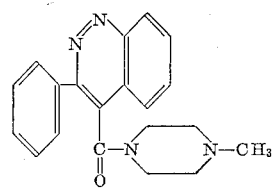

1 - ethyl-4-(3-phenylcinnoline-4-carbonyl)piperazine is obtained in an analogous manner starting with 1-ethyl-piperazine.

Example 2

A solution of 26.9 parts of 3-phenylcinnoline-4-carbonyl chloride in 400 parts of 2-butanone is added portionwise, with stirring, to a solution of 25 parts of piperazine in 1200 parts of 2-butanone over a period of 1 hour. The mixture is then stirred for an additional hour and filtered to remove a tan powder which is piperazine hydrochloride. The solvent is evaporated from the filtrate under reduced pressure and the residue is dissolved in 1000 parts of dilute hydrochloric acid. The acid solution is filtered to remove a small amount of insoluble material and it is then made alkaline and extracted with methylene chloride. The methylene chloride extract is washed with water and then dried by shaking with saturated aqueous sodium chloride solution followed by filtration through anhydrous potassium carbonate. The solvent is evaporated from the dry solution to leave a residual brown glass which crystallizes on standing. The product obtained in this way is 3-phenyl - 4-(1-piperazinylcarbonyl)cinnoline. This free amine can be converted to the maleic acid salt by dissolving equimolar quantities of the amine and the acid in warm methanol and then cooling the solution. The maleic acid salt is obtained as shiny tan plates melting at about 186–187° C. The free base has the following formula

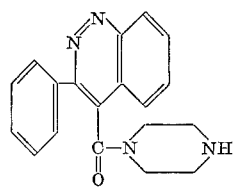

Example 3

Piperazine is reacted with 3-(4-chlorophenyl)cinnoline - 4 - carbonyl chloride and 3-(4-methoxyphenyl)-cinnoline-4-carbonyl chloride according to the procedure described in Example 2 to give, respectively, 3-(4-chlorophenyl) - 4 - (1-piperazinylcarbonyl)cinnoline and 3-(4-methoxyphenyl)-4-(1-piperazinylcarbonyl)cinnoline.

Example 4

5.4 parts of 3-phenylcinnoline-4-carbonyl chloride in 135 parts of methylene chloride is added portionwise with stirring to a solution of 6.5 parts of 1-(2-hydroxyethyl)piperazine in 270 parts of methylene chloride. The mixture is allowed to stand for 16 hours. It is then washed with dilute potassium hydroxide solution and extracted with dilute hydrochloric acid. The acid extract is made alkaline and then extracted with methylene chloride. The resultant methylene chloride solution is dried, first by shaking with a saturated aqueous solution of sodium chloride and then by filtering through anhydrous potassium carbonate. The solvent is evaporated from the dried solution and the resultant residue is recrystallized from a mixture of methanol and ether to give yellow rods of 1-(2-hydroxyethyl)-4-(3-phenylcinnoline-4-carbonyl)piperazine melting at about 125–127° C. This compound has the following formula

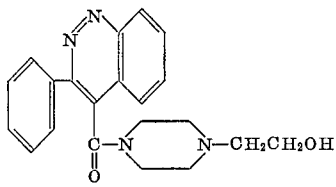

The corresponding compound containing a hydroxypropyl group in place of the hydroxyethyl group can be obtained in an analogous manner by starting with 1-(3-hydroxypropyl)piperazine.

Example 5

The 3-phenylcinnoline-4-carbonyl chloride obtained from 10 parts of the corresponding carboxylic acid is dissolved in 270 parts of chloroform and added portionwise, with stirring, to a solution of 6.4 parts of 1-aminopiperazine and 6 parts of triethylamine in 540 parts of methylene chloride. The resultant mixture is allowed to stand for 48 hours and it is then washed with dilute potassium hydroxide solution. The alkaline washing removes any hydrazide formed in the reaction. The chloroform solution is dried by shaking with saturated aqueous sodium chloride solution and then filtering through anhydrous potassium carbonate. The solvent is evaporated from the filtrate and the residue is recrystallized from a mixture of methanol and ether to give 1-amino-4-(3-phenylcinnoline-4-carbonyl)piperazine as yellow needle-clusters melting at about 164–167° C. This compound has the following formula

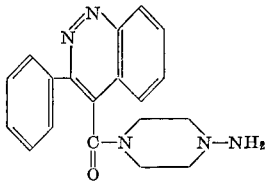

Example 6

A solution is prepared from 5 parts of 1-amino-4-(3-phenylcinnoline-4-carbonyl)piperazine, 3 parts of acetic anhydride, and 135 parts of methylene chloride. It is allowed to stand for 16 hours and then refluxed for 15 minutes. The cooled solution is then washed with dilute potassium hydroxide solution and dried, first by shaking with saturated aqueous sodium chloride solution and then by filtering through anhydrous potassium carbonate. The solvent is evaporated from the dried solution and the residual material is recrystallized from a mixture of benzene, methanol and ether. The resultant yellow powder, which melts at 181–182° C., is 1-acetamido-4-(3-phenylcinnoline-4-carbonyl)piperazine.

What is claimed is:
1. A compound of the formula

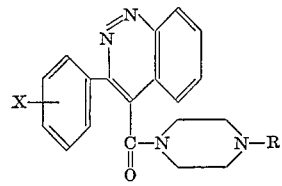

wherein X is selected from the group consisting of hydrogen, chlorine, and methoxy; and R is selected from the group consisting of hydrogen, lower alkyl, and hydroxy-(lower alkyl).

2. 3-phenyl-4-(1-piperazinylcarbonyl)cinnoline.

3. 1 - methyl - 4 - (3 - phenylcinnoline-4-carbonyl)piperazine.

4. 1 - (2 - hydroxyethyl)-4-(3-phenylcinnoline-4-carbonyl)piperazine.

No references cited.

ALEX MAZEL, *Primary Examiner.*

H. R. JILES, *Assistant Examiner.*